(12) United States Patent  
Fourney

(10) Patent No.: US 9,010,523 B2  
(45) Date of Patent: Apr. 21, 2015

(54) LOW BACK-PRESSURE ACCUMULATION SYSTEM

(75) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 5 days.

(21) Appl. No.: 14/114,200

(22) PCT Filed: Apr. 27, 2012

(86) PCT No.: PCT/US2012/035513  
§ 371 (c)(1),  
(2), (4) Date: Oct. 26, 2013

(87) PCT Pub. No.: WO2012/151127  
PCT Pub. Date: Nov. 8, 2012

(65) Prior Publication Data  
US 2014/0054137 A1     Feb. 27, 2014

Related U.S. Application Data

(60) Provisional application No. 61/481,543, filed on May 2, 2011.

(51) Int. Cl.  
*B65G 17/24*     (2006.01)  
*B65G 17/06*     (2006.01)  
*B65G 13/00*     (2006.01)  
*B65G 13/06*     (2006.01)  
*B65G 47/26*     (2006.01)

(52) U.S. Cl.  
CPC .............. *B65G 17/061* (2013.01); *B65G 13/00* (2013.01); *B65G 13/065* (2013.01); *B65G 47/261* (2013.01)

(58) Field of Classification Search  
CPC ...... B65G 17/24; B65G 13/06; B65G 17/061; B65G 13/02  
USPC ............ 198/779, 850, 851, 852, 853, 370.03, 198/371.3  
See application file for complete search history.

(56) References Cited

U.S. PATENT DOCUMENTS

| | | | |
|---|---|---|---|
| 2,777,566 A | * | 1/1957 | King .............................. 198/779 |
| 3,237,755 A | | 3/1966 | Weihe, Jr. |
| 3,653,489 A | | 4/1972 | Tullis et al. |
| 3,675,760 A | | 7/1972 | Burrage et al. |
| 3,894,627 A | | 7/1975 | Jabbusch et al. |
| 4,262,794 A | | 4/1981 | Bourgeois |
| 4,293,064 A | | 10/1981 | Robinson |

(Continued)

FOREIGN PATENT DOCUMENTS

| | | |
|---|---|---|
| DE | 7246322 A | 4/1973 |
| GB | 2278329 A | 11/1994 |

(Continued)

*Primary Examiner* — James R Bidwell  
(74) *Attorney, Agent, or Firm* — James T. Cronvich

(57) ABSTRACT

A belt conveyor having upper article-supporting belt rollers that are rotated rearward by rotating lower belt rollers only when the articles are slowed or stopped from advancing with the belt. As the belt advances in a direction of travel, the lower rollers rotate by contact with a bearing surface underlying the belt. The upper rollers have axles whose ends are retained in slots that slope downward in the belt's direction of travel. The slots provide the upper rollers a range of positions between a forward position out of contact with the rotating lower roller and a rearward position contacting the lower roller, which rotates the upper roller rearward relieving back line pressure on accumulated articles.

13 Claims, 1 Drawing Sheet

(56) References Cited

U.S. PATENT DOCUMENTS

| | | |
|---|---|---|
| 5,038,921 A | 8/1991 | Hoppmann et al. |
| 5,190,137 A | 3/1993 | Tas |
| 5,238,099 A | 8/1993 | Schroeder et al. |
| 6,318,544 B1 | 11/2001 | O'Connor et al. |
| 6,494,312 B2 | 12/2002 | Costanzo |
| 6,571,937 B1 | 6/2003 | Costanzo et al. |
| 7,040,480 B2 | 5/2006 | Sedlacek |
| 7,344,018 B2 | 3/2008 | Costanzo et al. |
| 7,357,246 B2 | 4/2008 | Costanzo |
| 7,360,641 B1 | 4/2008 | Fourney |
| 7,588,137 B2 | 9/2009 | Fourney |
| 8,424,675 B2 | 4/2013 | Rau |
| 8,678,180 B2 * | 3/2014 | Marshall et al. ............ 198/853 |

FOREIGN PATENT DOCUMENTS

| | | |
|---|---|---|
| JP | 60252509 A | 12/1985 |
| JP | H2-7218 A | 1/1990 |
| JP | 03-88617 A | 4/1991 |
| JP | 08-277029 A | 10/1996 |

* cited by examiner

LOW BACK-PRESSURE ACCUMULATION SYSTEM

BACKGROUND

The invention relates generally to power-driven conveyors and more particularly to belt conveyor systems having article-supporting belt rollers actuatable to rotate rearward to accumulate conveyed articles.

Conveyors are used in industrial applications to transport articles from one processing station to another. Often a continuously moving conveyor belt is used to deliver articles to a downstream processing station. As soon as the supply of articles exceeds the handling capacity of the downstream processing station, the articles begin to back up upstream of the processing station. Friction between the conveying surface of the moving belt and the backed-up, or accumulated, articles causes the articles to push against each other. The pressure exerted against the article at the front of the group of accumulated articles is called back line pressure. As more articles back up, the back line pressure increases. Back line pressure can cause damage to the articles, excessively load the conveyor belt and its drive components, and accelerate belt wear. Roller-top belts with freely rotatable rollers in rolling contact with the undersides of conveyed articles are often used to reduce friction and lower back line pressure. But even roller-top belts cannot decrease back line pressure to zero by themselves. Roller-top belts whose rollers are driven opposite to the direction of belt travel by another belt positioned below the roller-top belt in contact with the bottoms of the rollers and running faster than the roller-top belt are also known. But this solution requires a second belt and a separate drive system, as well as other complexities. Zone accumulation, in which a series of separately driven conveyors can be stopped and started depending on the downstream demand and upstream supply of articles, is used to eliminate back line pressure. But zone accumulation requires multiple drives and sensors, which can be costly, and, between consecutive conveying zones, transfers, at which articles are susceptible to tipping.

SUMMARY

These shortcomings are addressed by a conveyor system embodying features of the invention. One version of such a conveyor system comprises a conveyor belt advancing in the direction of travel along a carryway. The conveyor belt includes lower rollers, each of which has a salient portion protruding from a bottom side of the belt, an axis of rotation perpendicular to the direction of travel, and upper rollers, each of which is associated with one of the lower rollers. A salient portion of each of the upper rollers protrudes from a top side of the belt to support conveyed articles. Each upper roller has an axle whose opposite ends are received in slots on opposite sides of the upper roller. The slots are elongated and slope downward in the direction of travel to provide a range of positions for the upper roller between a forward position out of contact with the lower roller and a rearward position in contact with the associated lower roller. A bearing surface under the conveyor belt along the carryway provides a surface on which the lower rollers rotate as the belt advances forward along the carryway. The weight of an article on an upper roller applies a first force that pushes the upper roller forward toward the forward position and out of contact with the associated rotating lower roller. The drag between the article and the upper roller applies a second force that pushes the upper roller toward the rearward position. When the second force exceeds the first force, the upper roller is pushed into the rearward position and into contact with the rotating lower roller, which rotates the upper roller rearward to reduce the back line pressure on the article.

Other aspects of the invention include conveyor belt modules that include one or more sets of associated upper and lower rollers in which the upper rollers are movable into and out of contact with the lower rollers and modular conveyor belts constructed of a plurality of rows of the belt modules linked together at hinge joints between consecutive rows.

BRIEF DESCRIPTION OF THE DRAWINGS

These features and aspects of the invention, as well as its advantages, are explained in more detail in the following description, appended claims, and accompanying drawings, in which:

DETAILED DESCRIPTION

Figure 1:
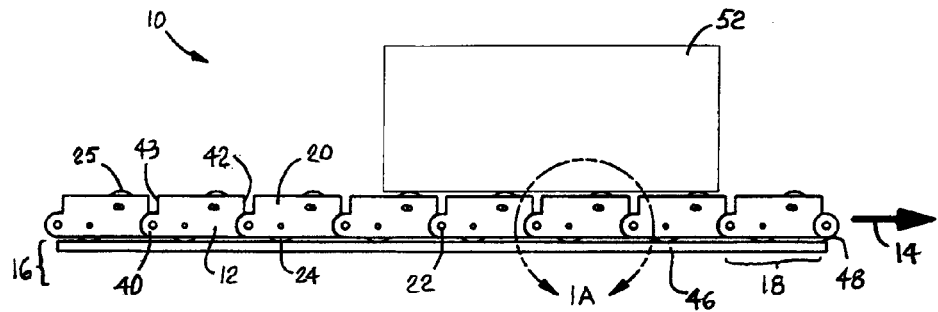
FIG. 1 is a side elevation view of a portion of a conveyor system embodying features of the invention shown conveying an article without accumulation.

A conveyor embodying features of the invention as shown in FIGS. 1, 1A, 2, and 2A. The conveyor 10 comprises a conveyor belt 12 advancing in a direction of travel 14 along a carryway 16. The conveyor belt is an endless loop that is conventionally trained around drive and idle sprockets, pulleys, or drums at opposite ends of the carryway and returns along a lower returnway (all not shown). The conveyor belt in this example is a modular conveyor belt constructed of a series of rows 18 of one or more conveyor belt modules 20 hingedly linked together by hinge pins, for example, at hinge joints 22 between consecutive rows. The belt modules may be made of any appropriate materials. For example, they may be injection-molded out of a thermoplastic polymer, such as polypropylene, polyethylene, acetal, or composites. But the conveyor belt could be a rubber or fabric belt or a metal belt.

Figure 1A:
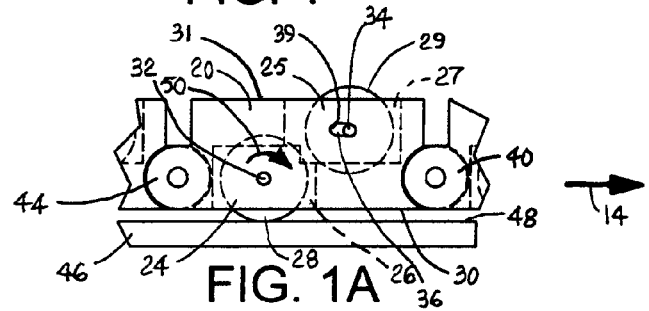
FIG. 1A is an enlarged side elevation view of a portion of the conveyor system of FIG. 1 showing an upper belt roller disengaged from a lower belt roller.
Figure 2:
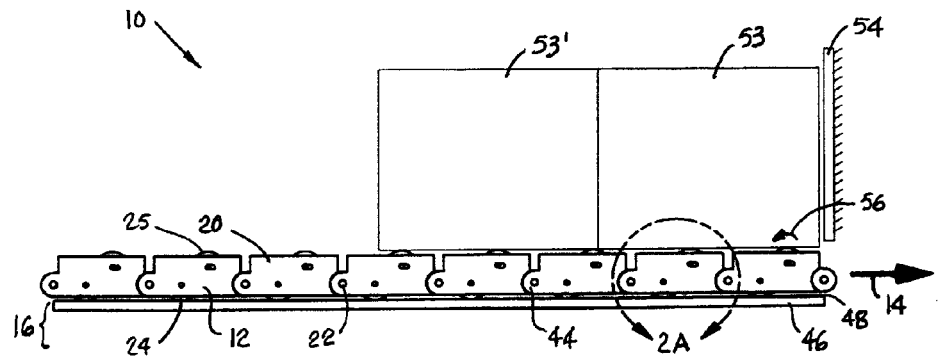
FIG. 2 is a side elevation view of the conveyor system of FIG. 1 shown accumulating conveyed articles.
Figure 2A:
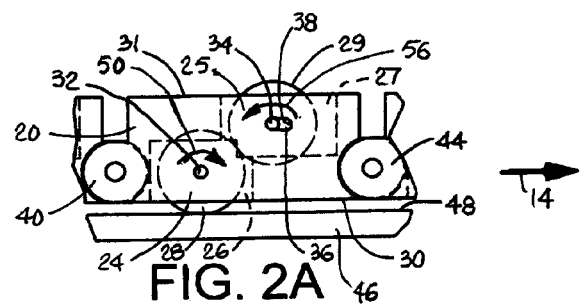
FIG. 2A is an enlarged side elevation view of a portion of the conveyor system of FIG. 2 showing an upper belt roller engaged with a lower belt roller.

As best shown in FIGS. 1A and 2A, the belt modules 20 have at least one pair of associated rollers: a lower roller 24 and an upper roller 25. The lower roller 24 is mounted in a lower cavity 26 in the belt module. A salient portion 28 of the lower roller protrudes below a bottom side 30 of the belt module. The lower roller 24 rotates on an axle 32 defining an axis of rotation extending across a portion of the width of the module perpendicular to the direction of travel 14. The axle 32 may be either a stationary axle affixed within the belt module 20 and received in a central bore through the lower roller 24 or an axle or pair of axle stubs affixed to the lower roller to rotate with it and whose ends are rotatably retained within the module. The associated upper roller 25 of the roller pair is mounted in an upper cavity 27 opening onto a top side 31 of the module. A salient portion 29 of the upper roller protrudes above the top side 31. The upper roller 25 includes an axle 34 whose opposite ends are supported in aligned slots 36 formed in the module at opposite sides of the upper cavity 27 housing the upper roller 25. The axles of the upper and lower rollers are parallel to each other. The axle 34 is affixed to and rotates with the upper roller 25. The slots 36 are elongated and sloped downward in the direction of travel 14 with forward ends 38 of the slots disposed slightly below the level of the opposite rearward ends 39. In this way, the slots provide the rollers with a range of positions between a forward position and a rearward position. The slots, which slope downward away from the top 31 of the belt module, are closer to the top of the module than the axis of rotation 32 of the lower roller 24. And the slots are offset in the direction of travel 14 from the lower roller's axis of rotation. The modules also include hinge elements 40 along forward and rearward ends 42, 43. The hinge elements of each module interleave with the hinge elements of adjacent modules. One or more hinge pins (not shown) connect the interleaved hinge elements together at a hinge joint 44 between adjacent belt rows 18.

The conveyor 10 also includes a flat plate 46 lying under the conveyor belt 12 along the carryway 16. The flat plate provides a bearing surface 48 that the lower belt rollers 24 ride on as the belt advances in the direction of travel. The flat plate supports the belt through the lower rollers. As one alternative, the bearing surface could be formed as the top horizontal surfaces of a plurality of parallel strips aligned with the lateral positions of the lower rollers across the carryway. Motion of the conveyor belt 12 along the carryway 16 in the direction of travel 14 causes the lower rollers 24 riding along the bearing surface 48 to rotate forward on their axes 32 in the direction of belt travel as indicated by the arrow 50.

FIG. 1 shows an article 52 being conveyed on the conveyor belt 12 atop the upper rollers 25. The article is conveyed by the belt in the direction of travel 14 at the speed of the belt. The article's position is stationary with respect to the belt. The weight of the article applies a force to the upper rollers supporting it that pushes the axles 34 of the rollers down the sloping slots 36 to their lower forward ends 38. The upper rollers are then in their forward positions as shown in FIG. 1A. In the forward positions, the upper rollers 25 are out of contact with their associated rotating lower rollers 24. Thus, the upper rollers are free to rotate on their axles.

FIG. 2 shows two articles 53, 53' blocked by an obstruction 54, a stop or a gate, or any impediment slowing or stopping the advance of articles at the speed of the belt. The obstruction, which would typically be movable into and out of an obstructing position, blocks the progress of the articles along the belt when in its obstructing position. In this example, the obstruction blocks the progress of the articles along the belt completely. As more and more articles accumulate upstream of the obstruction, the back pressure on the blocked articles increases. The back pressure produces a drag force between the bottoms of the articles and the upper supporting rollers 25. The drag force rolls the axles 34 of the upper rollers rearward up the sloping slots 36 toward their rearward ends 39. As the axles are rolled up the slots, the upper rollers 25 rotate in the rearward direction. When the drag force on an upper roller exceeds the force due to the weight of the article on the roller, the axle is pushed against the rearward end of the slot as shown in FIG. 2A. The upper roller, in its rearward position, contacts its forward-rotating lower roller 24 and is rotated on its axle rearward as indicated by the arrow 56. Articles atop rearward-rotating upper rollers are pushed rearward at about the same speed as the conveyor belt 12 is advancing in the forward direction of travel 14, so that the articles maintain their positions without relying on contact with a downstream article. The rearward rotation of the upper rollers significantly reduces the back line pressure on the accumulated articles.

What is claimed is:

1. A conveyor belt module comprising:
    a top and a bottom;
    a lower roller having a salient portion protruding from the bottom and having an axis of rotation perpendicular to a direction of travel of a conveyor belt containing the conveyor belt module;
    an upper roller having a salient portion protruding from the top, the upper roller having an axle;
    two slots elongated in the direction of travel on opposite sides of the upper roller for receiving opposite ends of the upper roller's axle and providing a range of positions for the upper roller between a forward position out of contact with the lower roller and a rearward position in contact with the lower roller.

2. A conveyor belt module as in claim 1 wherein the slots are closer to the top than the axis of rotation of the lower roller and offset in the direction of travel from the axis of rotation of the lower roller.

3. A conveyor belt module as in claim 1 wherein the slots slope downward away from the top in the direction of travel.

4. A conveyor belt module as in claim 1 wherein the upper roller's axle is affixed to and rotates with the upper roller.

5. A conveyor belt comprising:
    a plurality of rows of conveyor belt modules hingedly linked together at hinge joints between consecutive rows for advancing in a direction of travel, at least some of the conveyor belt modules including:
    a top and a bottom;
    a lower roller having a salient portion protruding from the bottom and having an axis of rotation perpendicular to the direction of travel;
    an upper roller having a salient portion protruding from the top for supporting conveyed articles, the upper roller having an axle;
    two slots elongated in the direction of travel on opposite sides of the upper roller for receiving opposite ends of the upper roller's axle and providing a range of positions for the upper roller between a forward position out of contact with the lower roller and a rearward position in contact with the lower roller.

6. A conveyor belt as in claim 5 wherein the slots are closer to the top than the axis of rotation of the lower roller and offset in the direction of travel from the axis of rotation of the lower roller.

7. A conveyor belt as in claim 5 wherein the slots slope downward away from the top in the direction of travel.

8. A conveyor belt as in claim 5 wherein the upper roller's axle is affixed to and rotates with the upper roller.

9. A conveyor comprising:
    a carryway;
    a conveyor belt advancing forward in a direction of travel along the carryway, the conveyor belt including:
    a top side and a bottom side;
    a plurality of lower rollers, each having a salient portion protruding from the bottom side and having an axis of rotation perpendicular to the direction of travel;
    a plurality of upper rollers, each associated with one of the lower rollers and having an axle and having a salient portion protruding from the top side for supporting conveyed articles;
    two slots associated with each upper roller, wherein the two slots are elongated and sloped downward in the direction of travel on opposite sides of the upper roller for receiving opposite ends of the upper roller's axle and provide a range of motion for the upper roller between a forward position out of contact with the associated lower roller and a rearward position in contact with the associated lower roller;

a bearing surface underlying the bottom side of the conveyor belt along the carryway and providing a surface on which the lower rollers rotate as the conveyor belt advances forward along the carryway in the direction of travel;

wherein the weight of an article on an upper roller applies a first force pushing the upper roller toward the forward position and out of contact with the associated rotating lower roller and wherein the drag between the article and the upper roller applies a second force pushing the upper roller toward the rearward position so that, when the second force exceeds the first force, the upper roller is in the rearward position and in contact with the rotating lower roller and rotated rearward to reduce the back line pressure on the article.

10. A conveyor as in claim 9 further comprising an obstruction stopping or reducing the speed of conveyed articles along the carryway.

11. A conveyor as in claim 9 wherein contact between the lower and upper rollers when the upper roller is in the rearward position causes the upper rollers to rotate rearward at substantially the same speed as the speed of the conveyor belt in the forward direction of travel.

12. A conveyor as in claim 9 wherein the conveyor belt includes a plurality of rows of conveyor belt modules hingedly linked together at hinge joints between consecutive rows for advancing in a direction of travel, at least some of the conveyor belt modules including at least one of the upper rollers and at least one of the lower rollers.

13. A conveyor as in claim 9 wherein the upper roller's axle is affixed to and rotates with the upper roller.

* * * * *